(12) United States Patent
Tanaka et al.

(10) Patent No.: US 12,524,559 B2
(45) Date of Patent: Jan. 13, 2026

(54) PROCESSING SYSTEM, PROCESSING METHOD, AND PROCESSING PROGRAM

(71) Applicant: NTT Communications Corporation, Tokyo (JP)

(72) Inventors: Satoshi Tanaka, Tokyo (JP); Yoichi Sakurai, Tokyo (JP); Masashi Sawada, Tokyo (JP)

(73) Assignee: NTT COMMUNICATIONS CORPORATION, Tokyo (JP)

( * ) Notice: Subject to any disclaimer, the term of this patent is extended or adjusted under 35 U.S.C. 154(b) by 176 days.

(21) Appl. No.: 18/372,735

(22) Filed: Sep. 26, 2023

(65) Prior Publication Data

US 2024/0020398 A1 Jan. 18, 2024

Related U.S. Application Data

(63) Continuation of application No. PCT/JP2022/014567, filed on Mar. 25, 2022.

(30) Foreign Application Priority Data

Mar. 26, 2021 (JP) .................. 2021-053164

(51) Int. Cl.
*G06F 21/60* (2013.01)
*G06F 21/62* (2013.01)

(52) U.S. Cl.
CPC .............. *G06F 21/62* (2013.01); *G06F 21/60* (2013.01); *G06F 21/6227* (2013.01)

(58) Field of Classification Search
CPC ...... G06F 21/60; G06F 21/62; G06F 21/6227; G06F 21/6245; G06F 21/6254
See application file for complete search history.

(56) References Cited

U.S. PATENT DOCUMENTS

| | | | |
|---|---|---|---|
| 2013/0246812 A1* | 9/2013 | Resch ................ | H04L 9/0894 713/193 |
| 2014/0122442 A1 | 5/2014 | Takenouchi | |
| 2020/0327252 A1 | 10/2020 | Mcfall et al. | |

(Continued)

FOREIGN PATENT DOCUMENTS

| | | | | |
|---|---|---|---|---|
| CA | 2504680 C | * | 4/2014 | ......... H04L 63/0245 |
| CA | 3040147 A1 | * | 4/2018 | ............. G16B 50/50 |

(Continued)

OTHER PUBLICATIONS

NTT Secure Platform laboratories, "Secure Computation System—How it works", Available Online at: https://www.rd.ntt/sc/project/data-security/NTT-himitsu-keisan.pdf, Aug. 2018, pp. 1-34 (68 pages including English Translation).

(Continued)

*Primary Examiner* — Jayesh M Jhaveri
(74) *Attorney, Agent, or Firm* — XSENSUS LLP

(57) ABSTRACT

A processing system distributes original data in a state of being segmented shares to a plurality of servers, and stores the original data in the servers, each of the servers including processing circuitry configured to perform statistical processing on the shares that are used in computation that is requested by a requesting device, and perform the computation that is requested by the requesting device using statistical information into which conversion is made in the statistical processing.

4 Claims, 10 Drawing Sheets

(56) References Cited

U.S. PATENT DOCUMENTS

2020/0401715 A1* 12/2020 Linton .................. G06F 40/295
2023/0359770 A1 11/2023 Mcfall et al.

FOREIGN PATENT DOCUMENTS

| EP | 3 449 414 A1 | 3/2019 |
|----|--------------|--------|
| JP | 2013-156720 A | 8/2013 |
| JP | 2020-042128 A | 3/2020 |
| WO | 2019/124260 A1 | 6/2019 |

OTHER PUBLICATIONS

Kiribuchi et al., "MEVAL3: A Library for Programmable Secure Computation", The Institute of Electronics, Information and Communication Engineers, Symposium on Cryptography and Information Security (SCIS), Jan. 23-26, 2018, pp. 1-8 (16 pages including English Translation).

Kimura et al., "Evaluation of Secure Computation in a Distributed Healthcare Setting", European Federation for Medical Informatics (EFMI) and IOS Press., Medical Informatics Europe (MIE), doi:10.3233/978-1-61499-678-1-152, 2016, pp. 152-156.

Chida et al., "Implementation and evaluation of an efficient secure computation system using 'R' for healthcare statistics", J Am Med Inform Assoc., vol. 21, Apr. 24, 2014, pp. e326-e331.

Igarashi et al., "Hybrid Anonymization System According to Secure Computation and Randomization", The Institute of Electronics, Information and Communication Engineers, Preprints of the Symposium on Cryptography and Information Security 2012, Jan. 30-Feb. 2, 2012, pp. 1-8 (10 pages including English Translation).

Hamada et al., "Privacy preserving medical data analysis using a secure function evaluation system", The Institute of Electronics, Information and Communication Engineers, IEICE technical report, LOIS2011-102, Mar. 2012, pp. 177-181 (8 pages including English Translation).

Extended European Search Report issued May 16, 2024 in European Patent Application No. 22775843.0, 8 pages.

Ashwin Machanavajjhala, et al., "\ell-Diversity: Privacy Beyond \kappa-Anonymity" Proceedings of the 22nd International Conference on Data Engineering (ICDE '06), Apr. 3, 2006, 12 pages, XP010911611.

* cited by examiner

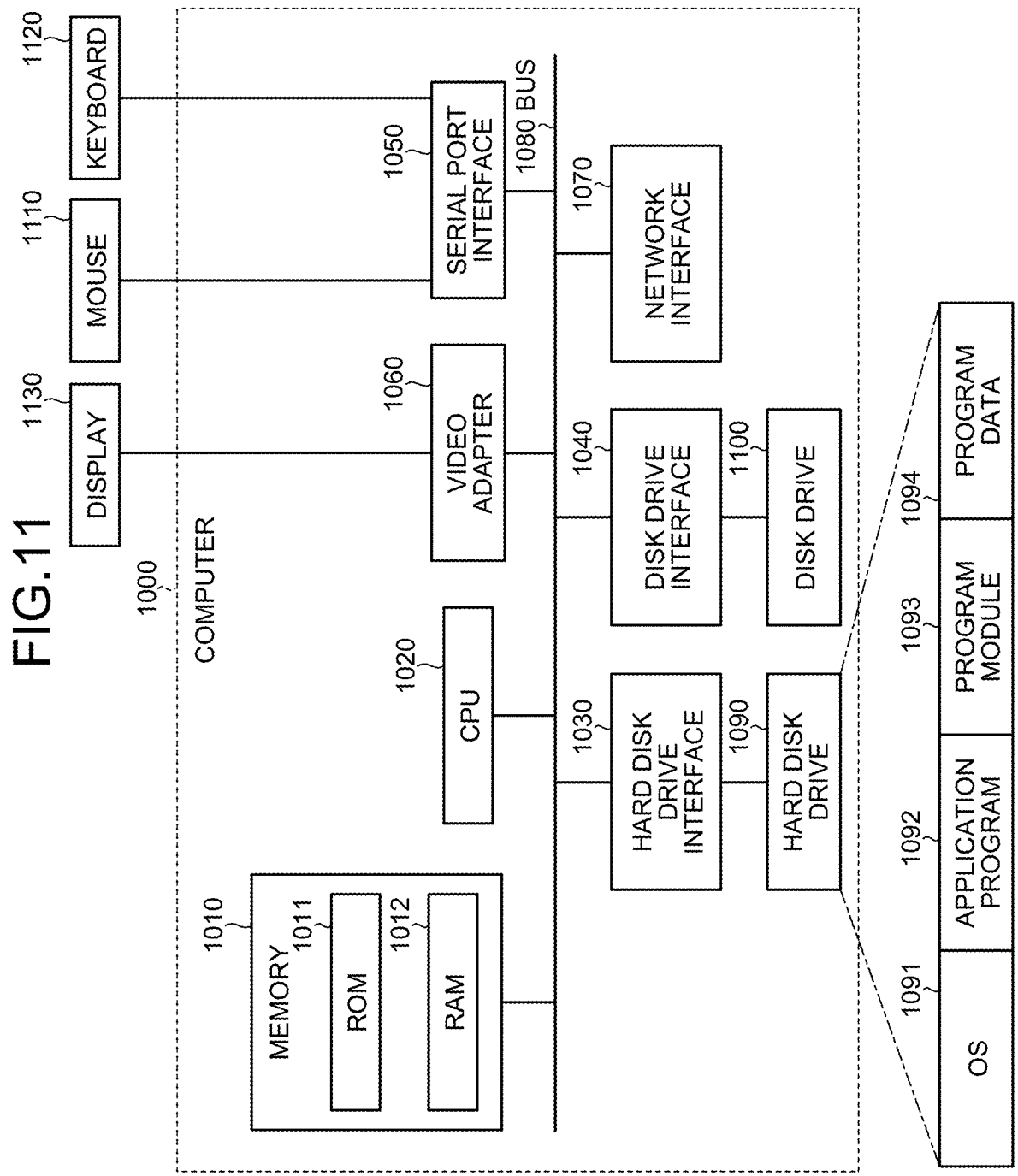

PROCESSING SYSTEM, PROCESSING METHOD, AND PROCESSING PROGRAM

CROSS-REFERENCE TO RELATED APPLICATIONS

This application is a continuation application of International Application No. PCT/JP2022/014567, filed on Mar. 25, 2022 which claims the benefit of priority of the prior Japanese Patent Application No. 2021-053164, filed on Mar. 26, 2021, the entire contents of which are incorporated herein by reference.

FIELD

The present invention relates to a processing system, a processing method, and a processing program.

BACKGROUND

Business operators that deal with important information, such as medical information, are requested not only to take security measurement in compliance with legal restrictions and specific field guidelines but also to use and utilize information safely. Particularly, storing interdisciplinary data and using and utilizing data are expected to promote innovation and lead to development of various fields, such as economic growth, and at the same time are causes of inhibition of promotion of use and utilization of data in terms of risks associated with disclosure of data and protection of business strategies, and the like.

Secure computing thus has been proposed as a technique that enables realization of these contradicting requests. Secure computing is a technique of keeping sensitive information confidential and sending only a result back without mutual disclosure.

Patent Literature 1: International Publication Pamphlet No. WO 2019/124260

Patent Literature 2: Japanese Laid-open Patent Publication No. 2020-042128

Non-Patent Literature 1: The Nippon Telegraph and Telephone Corporation, System and Principle of Secure Computing, [online], [searched on March 5th, Reiwa 3], the Internet <URL: rd.ntt/sc/project/data-security/NTT-himitsu-keisan.pdf>

Non-Patent Literature 2: Naoto Kiribuchi, Hiroshi Igarashi, Hiroki Hamada, Ryo Kikuchi, "Programmable Secure Computing Library MEVAL3", Code and Information Security Symposium (SCIS), 2018.

Non-Patent Literature 3: Eizen Kimura, Koki Hamada, Ryo Kikuchi, Koji Chida, Kazuya Okamoto, Shirou Manabe, Tomohiro Kuroda, Yasushi Matsumura, Toshihiro Takeda, and Naoki Mihara, "Evaluation of Secure Computation in a Distributed Healthcare Setting", Medical Informatics Europe (MIE) 2016: 152-156.

Non-Patent Literature 4: Koji Chida, Gembu Morohashi, Hitoshi Fuji, Fumihiko Magata, Akiko Fujimura, Koki Hamada, Dai Ikarashi, Ryuichi Yamamoto, "Implementation and evaluation of an efficient secure computation system using 'R' for healthcare statistics", J Am Med Inform Assoc. 21, pp. 326-331, 2014.

In secure computing, however, data is kept confidential by secret sharing and, under existing laws, secret sharing is one type of coding and deals with personal information. For this reason, when a third party tries to realize cross-sectional analysis in which data is linked between organizations by secure computing, the third party is exposed to the data when analyzing the data although the data is in a form of codes and provision of personal information to a third-party occurs. Secure computing thus has a problem in that gaining consent for provision of personal information to a third party is inevitable.

The present invention was made in view of the above-described circumstances and an object of the present invention is to provide a processing system, a processing method, and a processing program that enable nonnecessity for gaining consent for provision of personal information to a third party when data in secure computing is used.

SUMMARY

It is an object of the present invention to at least partially solve the problems in the related technology.

According to an aspect of the embodiments, a processing system distributes original data in a state of being segmented shares to a plurality of servers, and stores the original data in the servers, each of the servers including: processing circuitry configured to: perform statistical processing on the shares that are used in computation that is requested by a requesting device; and perform the computation that is requested by the requesting device using statistical information into which conversion is made in the statistical processing.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 11 is a diagram illustrating a computer that executes a program.

DESCRIPTION OF EMBODIMENTS

An embodiment of a processing system, a processing method, and a processing program according to the present application will be described in detail below based on the drawings. Note that the embodiment does not limit the processing system, the processing method, and the processing program according to the present application.

In the following embodiment, flows of processes of the processing system, the processing method, and the processing program according to the present application will be described in order and effects of the embodiment will be described at the end.

Embodiment

First of all, the embodiment will be described. In the embodiment, in secure computing in which computation can be performed with data being kept coded, statistical processing by secure computing is performed on data of each organization and, after the data of each organization is converted into statistical information by which no individual is identified, data coordination between organization by secure computing is performed using the statistical information. Accordingly, in the embodiment, it is unnecessary to gain consent for provision of personal information to a third party when data is used in secure computing.

Overview of Configuration of and Processes in Processing System

Figure 1:
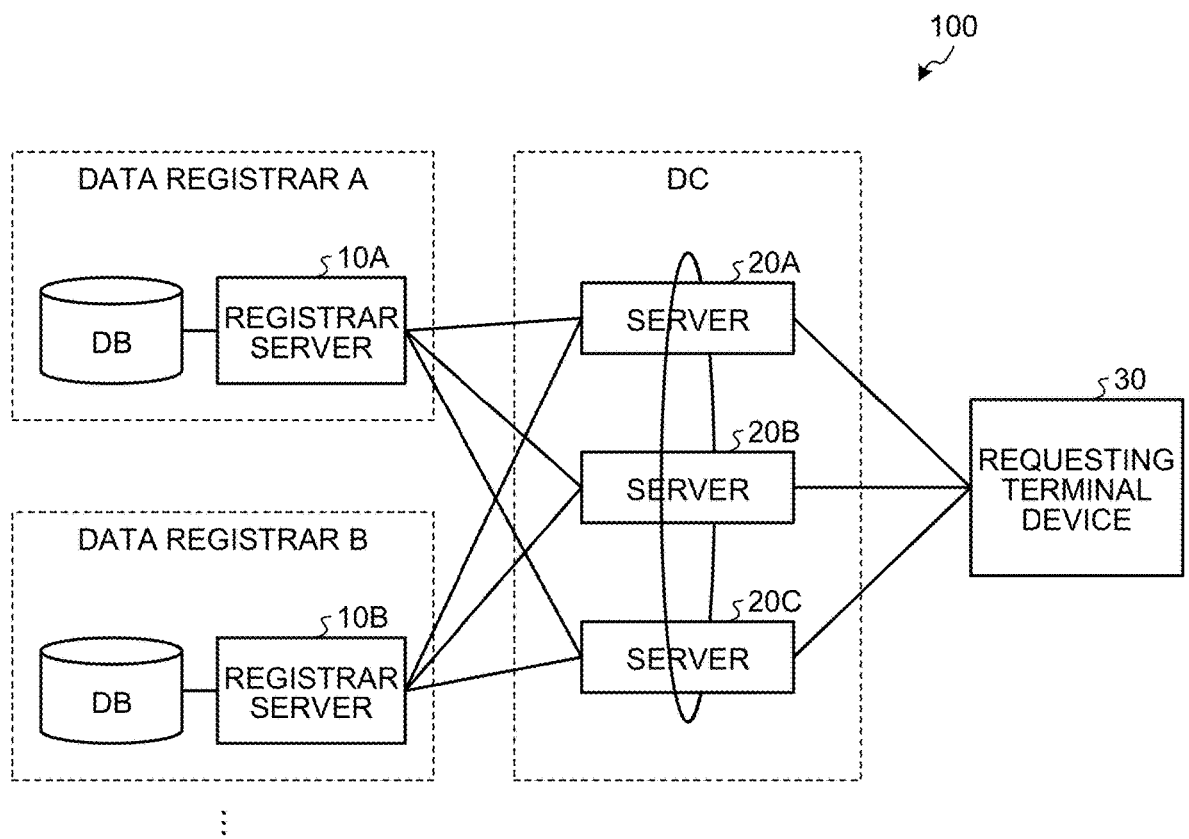
FIG. 1 is a block diagram illustrating an example of a configuration of a processing system according to an embodiment.
Figure 2:
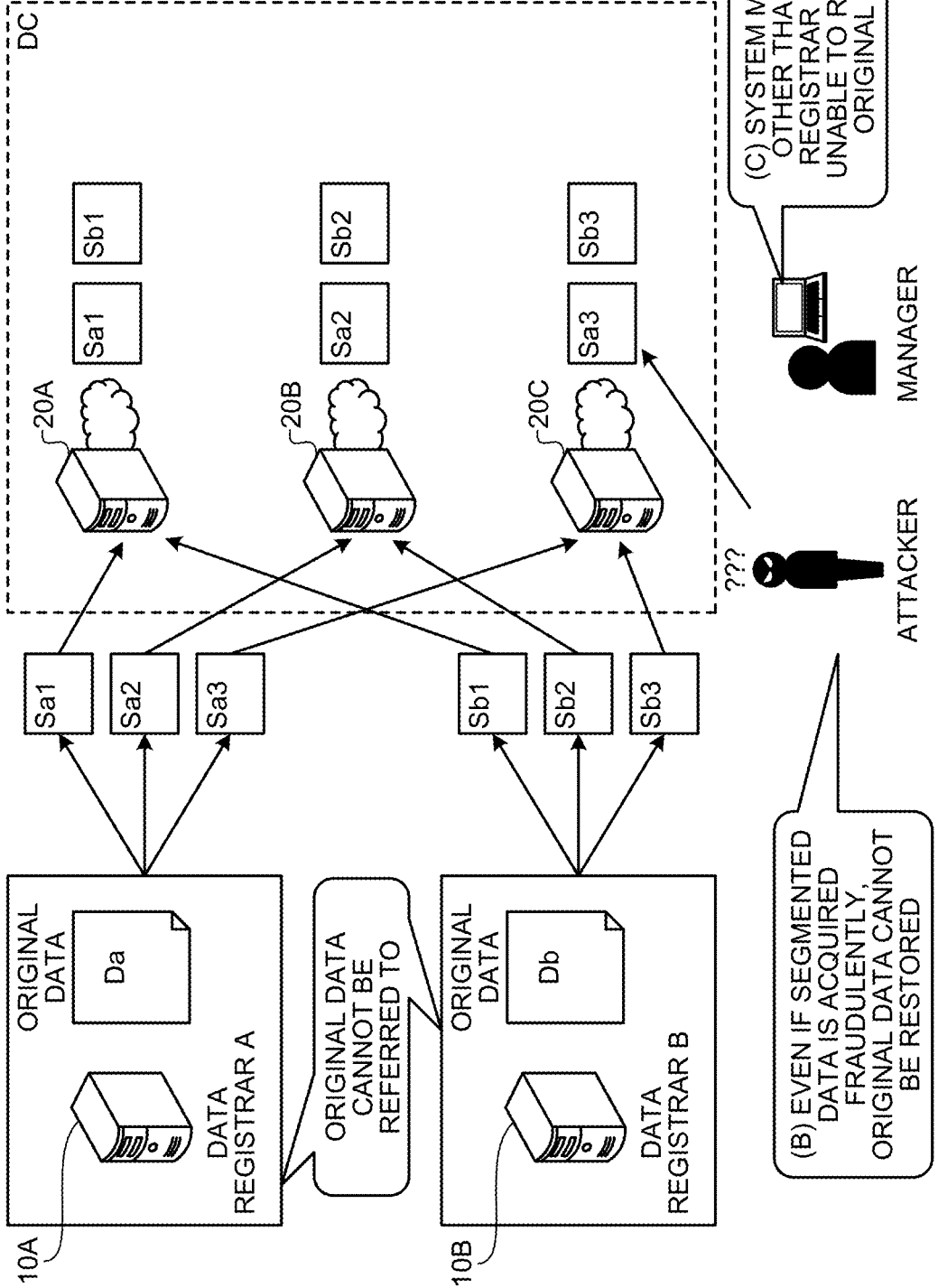
FIG. 2 is a diagram illustrating an overview of a process by the processing system according to the embodiment.
Figure 3:
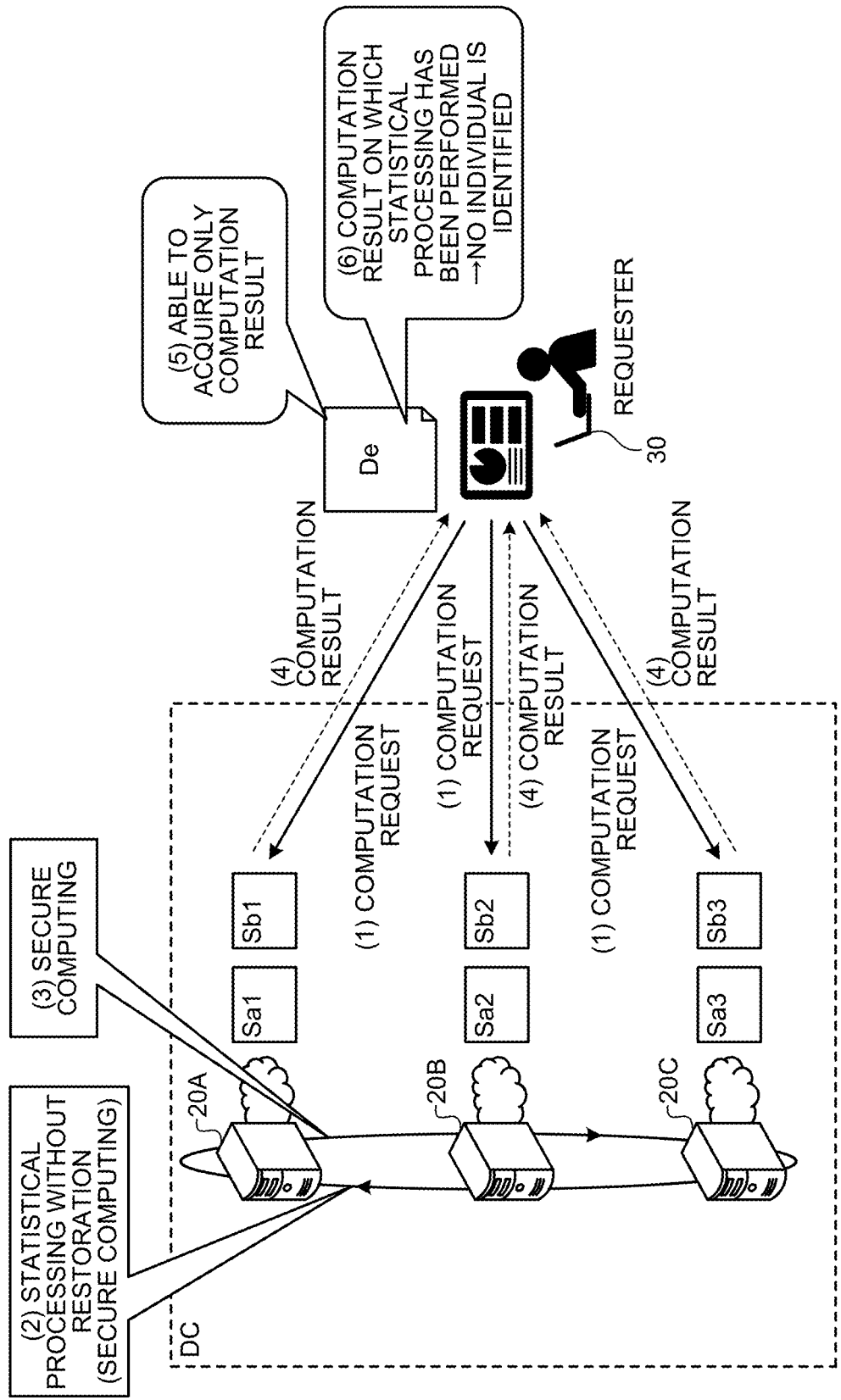
FIG. 3 is a diagram illustrating an overview of a process by the processing system according to the embodiment.

A configuration of the processing system and an overview of processes in the processing system according to the embodiment will be described. FIG. 1 is a block diagram illustrating an example of the configuration of the processing system according to the embodiment. FIG. 2 and FIG. 3 are diagrams illustrating the overview of the processes in the processing system according to the embodiment.

A processing system 100 according to the embodiment is a system that executes secure computing in which computation can be performed with data being kept coded. In the processing system 100, data is divided into a plurality of segments referred to as shares and, in the state where the shares are distributed to and stored in the servers, the servers perform multi-party computation in which computation and exchange of data are performed between the servers according to a determined procedure. The individual shares are meaningless data and it is not possible to restore the original data by only one share and information does not leak and, when a given number of shares gather, it is possible to restore the original data.

An example in which, as illustrated in FIG. 1, the processing system 100 consists of a registrar servers 10A and 10B of data registrars A and B, servers 20A, 20B and 20C in a data center (DC), and a requesting terminal device 30 that makes a computation request will be described below. Note that the configuration illustrated in FIG. 1 is an example only and a specific configuration and the number of sets of each device are not particularly limited. In order to simplify the description, the registrar servers 10A and 10B and the requesting terminal device 30 are described separately; however, in practical operation, the requesting terminal device 30 may have the function that the registrar servers 10A and 10B have.

First of all, a data storage process will be described. The registrar servers 10A and 10B upload data to a server group 20 of the DC. The registrar servers 10A and 10B segment original data Da and db to be uploaded into shares Sa1 to Sa3 and Sb1 to Sb3 ((1) in FIG. 2). The registrar servers 10A and 10B distribute the segmented respective shares Sa1 to Sa3 and Sb1 to Sb3 to the servers 20A to 20C of the DC and causes the servers 20A to 20C to store the shares ((2) in FIG. 2).

For example, the server 20A stores the shares Sa1 and Sb1, the server 20B stores the shares Sa2 and Sb2, and the server 20C stores the shares Sa3 and Sb3. The single one of the servers 20A to 20C is unable to restore the shares Sa1 to Sa3 and Sb1 to Sb3 into the original data. Thus, information does not leak from the individual shares Sa1 to Sa3 and Sb1 to Sb3.

The original data Da and the original data db thus are coded and registered in the servers 20A to 20C, respectively, and the registrar servers 10A and 10B are unable to refer to their original data mutually. Even if an attacker acquires part of the segmented shares fraudulently, the attacker is unable to restore the original data ((B) in FIG. 2). Even a system manager other than the data registrar who possesses the original data by himself/herself is unable to refer to the original data from the servers 20A to 20C of the DC ((C) in FIG. 2). As described above, the processing system 100 enables distribution and storage of data in a safe environment, that is, enables secret sharing ((2) in FIG. 2).

Subsequently, a secure computing process on the data on which secret sharing is performed will be described. The requesting terminal device 30 that a requester uses makes a request for computing on the data that the servers 20A to 20C of the DC store ((1) in FIG. 3). The requesting terminal device 30 sets a process procedure of a computing process corresponding to the request and transmits the set process procedure to each of the servers 20A to 20C.

Before performing the computing process that is requested by the requesting terminal device 30, the servers to 20C perform statistical processing in secure computing on the shares that are used in computation that is requested by the requesting terminal device 30 among the shares Sa1 to Sa3 and Sb1 to Sb3 that each of the servers to 20C stores ((2) in FIG. 3). The servers 20A to 20C perform multi-party computation in which computation and exchange of data are performed between the servers 20A to thereby performing statistical processing on the shares. In secure computing, a plurality of servers cooperatively perform computation. Secure computing deals with data always in a state of shares under secret sharing.

Then, using the statistical information into which conversion is made in statistical processing, the servers 20A to 20C perform the requested computation process according to the process procedure that is set by the requesting terminal device 30. The servers 20A to 20C perform secure computing in which data is computed in the state of shares without being restored ((3) in FIG. 3).

On ending the secure computing, each of the servers 20A to 20C transmits a computation result being kept coded to the requesting terminal device 30 ((4) in FIG. 3). By restoring each of the received computation results, the requesting terminal device 30 is able to acquire only a result De of the requested computation ((5) in FIG. 3). The computation result is a result on which statistical processing has been performed ((6) in FIG. 3). In other words, the computation result is a result that is computed after each set of data is converted into statistical information by which no individual is identified. Consequently, in secure computing, even when a cross-sectional analysis by a third party is made, statistical processing makes it possible to obtain a result in a form by which no individual is identified and it is unnecessary to gain consent for provision to a third party.

Registrar Server

Figure 4:
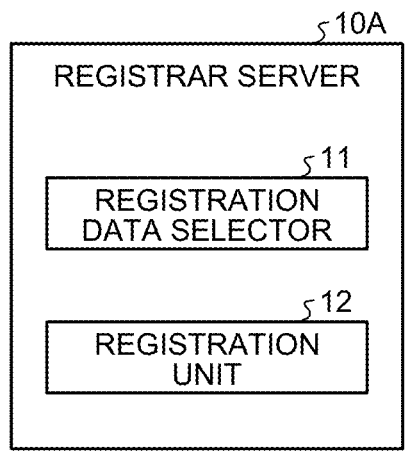
FIG. 4 is a diagram schematically illustrating an example of a configuration of a registrar server.

Subsequently, a configuration of each device of the processing system 100 will be described. First of all, a configuration of the registrar server 10A will be described. FIG. 4 is a diagram schematically illustrating an example of the configuration of the registrar server 10A. Note that the registrar server 10B has the same function as that of the registrar server 10A.

The registrar server 10A is realized in a way that a given program is read by a computer, or the like, that includes a ROM (Read Only Memory), a RAM (Random Access Memory), and a CPU (Central Processing Unit) and the CPU executes the given program. The registrar server 10A includes a communication interface that transmits and receives various types of information to and from another device that is connected via a network, or the like. For example, the registrar server 10A includes a NIC (Network Interface Card), or the like, and performs communication with another device via a telecommunication line, such as a LAN (Local Area Network) or the Internet. The registrar server 10A includes an input device, such as a touch panel, an audio input device, or a keyboard and a mouse, and a display device, such as a liquid crystal display, and inputs and outputs information. The registrar server 10A includes a registration data selector 11 and a registration unit 12.

According to operations by a person who operates the registrar server 10A, the registration data selector 11 selects data to be stored in the servers 20A to 20C by secret sharing from the data that is registered in the DB (Database) of the data registrar A.

The registration unit 12 divides the data that is selected by the registration data selector 11 into a plurality of shares, distributes the divided shares to servers 20A to 20C, respectively, and makes a request to register the shares. For example, the person who operates the registrar server 10A selects registration data and makes a request to distribute and store shares via a WebUI screen for the processing system 100 that is loaded by a Web browser.

Server

Figure 5:
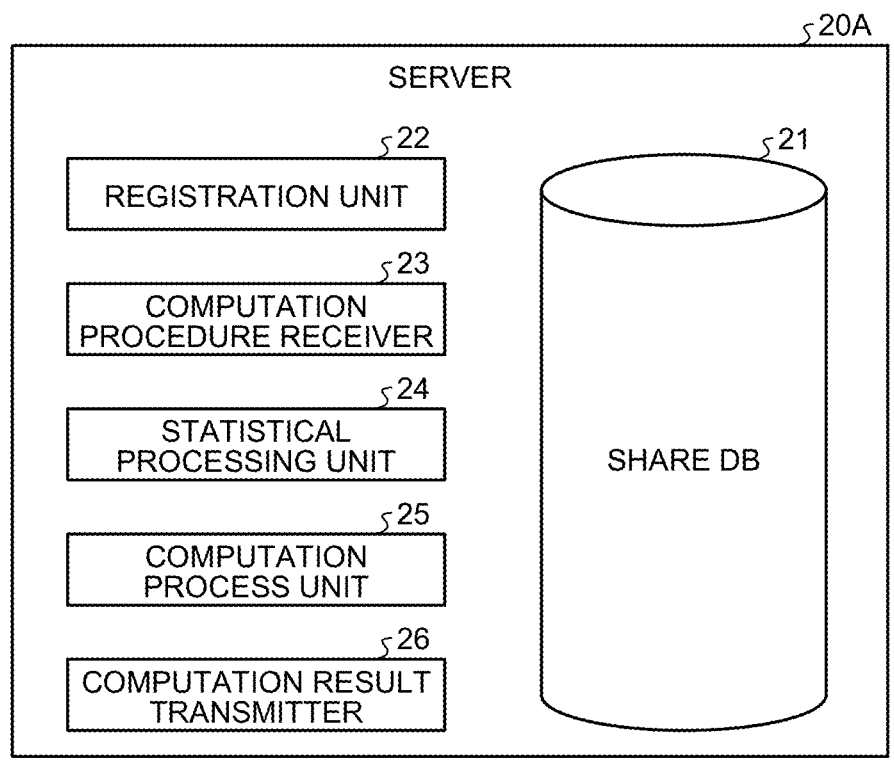
FIG. 5 is a diagram schematically illustrating an example of a configuration of a server.

A configuration of the server 20A will be described next. FIG. 5 is a diagram schematically illustrating an example of the configuration of the server 20A. Note that the servers 20B and 20C have the same function as that of the server 20A.

The server 20A is realized in a way that a given program is read by a computer, or the like, that includes a ROM, a RAM, and a CPU and the CPU executes the given program. The server 20A includes a communication interface that transmits and receives various types of information to and from another device that is connected via a network, or the like. For example, the server 20A includes a NIC, or the like, and performs communication with another device via a telecommunication line, such as a LAN or the Internet. The server 20A includes an input device, such as a touch panel, an audio input device, or a keyboard and a mouse, and a display device, such as a liquid crystal display, and inputs and outputs information. The server 20A includes a share DB 21, a registration unit 22, a computation procedure receiver 23, a statistical processing unit 24, a computation process unit 25, and a computation result transmitter 26.

The share DB 21 stores shares of which registration is requested by the registrar servers 10A and 10B.

The registration unit 22 receives registration requests from the registrar servers 10A and 10B and stores shares that of which registration is requested by the registrar servers 10A and 10B in the share DB 21.

The computation procedure receiver 23 receives the process procedure of the computation process that is set by the requesting terminal device 30.

Before performing of the computation process that is requested by the requesting terminal device 30, the statistical processing unit 24 performs statistical processing on shares that are used in the computation that is requested by the requesting terminal device 30 among the shares each of which is stored. The statistical processing unit 24 performs statistical processing in secure computing without restoring the data.

The statistical processing unit 24 converts a value by which an individual can be identified based on an aggregate value of the value and another value as the statistical processing. For example, the statistical processing unit 24 performs, as the statistical processing, conversion in which the aggregate value ensures a predetermined value on the shares that are used for the computation that is requested by the requesting terminal device 30. In the case of this example, the statistical processing unit 24 aggregates values of an area with values each smaller than a given value and, when the aggregate value is equal to or larger than a given value, converts each of the values of the area to an average value and, when the aggregate value is smaller than the given value, converts each of the values of the area to 0. Note that the statistical processing unit 24 is able to apply various types of methods as the statistical processing.

Using the statistic information into which conversion is made in the statistical processing, the computation process unit 25 performs the requested computation process according to the process procedure that is set by the requesting terminal device 30. The computation process unit 25 performs secure computing by performing multi-party computation in which computation and exchange of the statistical information in a state of shares are performed with other servers 20B and 20C. The computation result transmitter 26 transmits the result of the computation to the requesting terminal device 30.

Requesting Terminal Device

Figure 6:
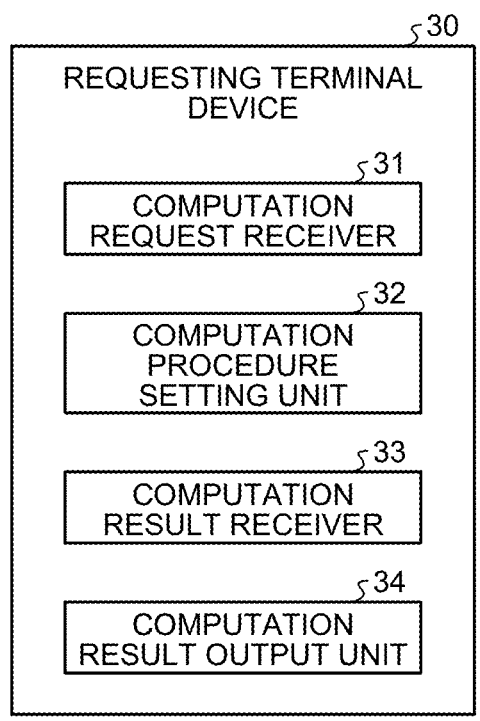
FIG. 6 is a diagram schematically illustrating an example of a configuration of a requesting terminal device.

A configuration of the requesting terminal device 30 will be described next. FIG. 6 is a diagram schematically illustrating an example of the configuration of the requesting terminal device 30.

The requesting terminal device 30 is realized in a way that a given program is read by a computer, or the like, that includes a ROM, a RAM, and a CPU and the CPU executes the given program. The requesting terminal device 30 includes a communication interface that transmits and receives various types of information to and from another device that is connected via a network, or the like. For example, the requesting terminal device 30 includes a NIC, or the like, and performs communication with another device via a telecommunication line, such as a LAN or the Internet. The requesting terminal device 30 includes an input device, such as a touch panel, an audio input device, or a keyboard and a mouse, and a display device, such as a liquid crystal display, and inputs and outputs information. The requesting terminal device 30 includes a computation request receiver 31, a computation procedure setting unit 32, a computation result receiver 33, and a computation result output unit 34.

The computation request receiver 31 receives a computation request on the data that the servers 20A to 20C store according to operations by the person (requester) who operates the requesting terminal device 30.

The computation procedure setting unit 32 sets a process procedure of a computation process corresponding to the request and transmits the computation request together with the set process procedure to each of the servers 20A to 20C.

The computation result receiver 33 receives a calculation result being kept coded from each of the servers 20A to 20C.

The computation result output unit 34 restores each of the received computation results and acquires only the requested computation results. The computation result output unit 34 then outputs the computation results. For example, the person who operates the requesting terminal device 30 inputs a computation request and specifies a form of display (table, graph, or the like) of a computation process result via a WebUI screen for the processing system 100 that is loaded by a Web browser.

Example of Computing

Figure 7:
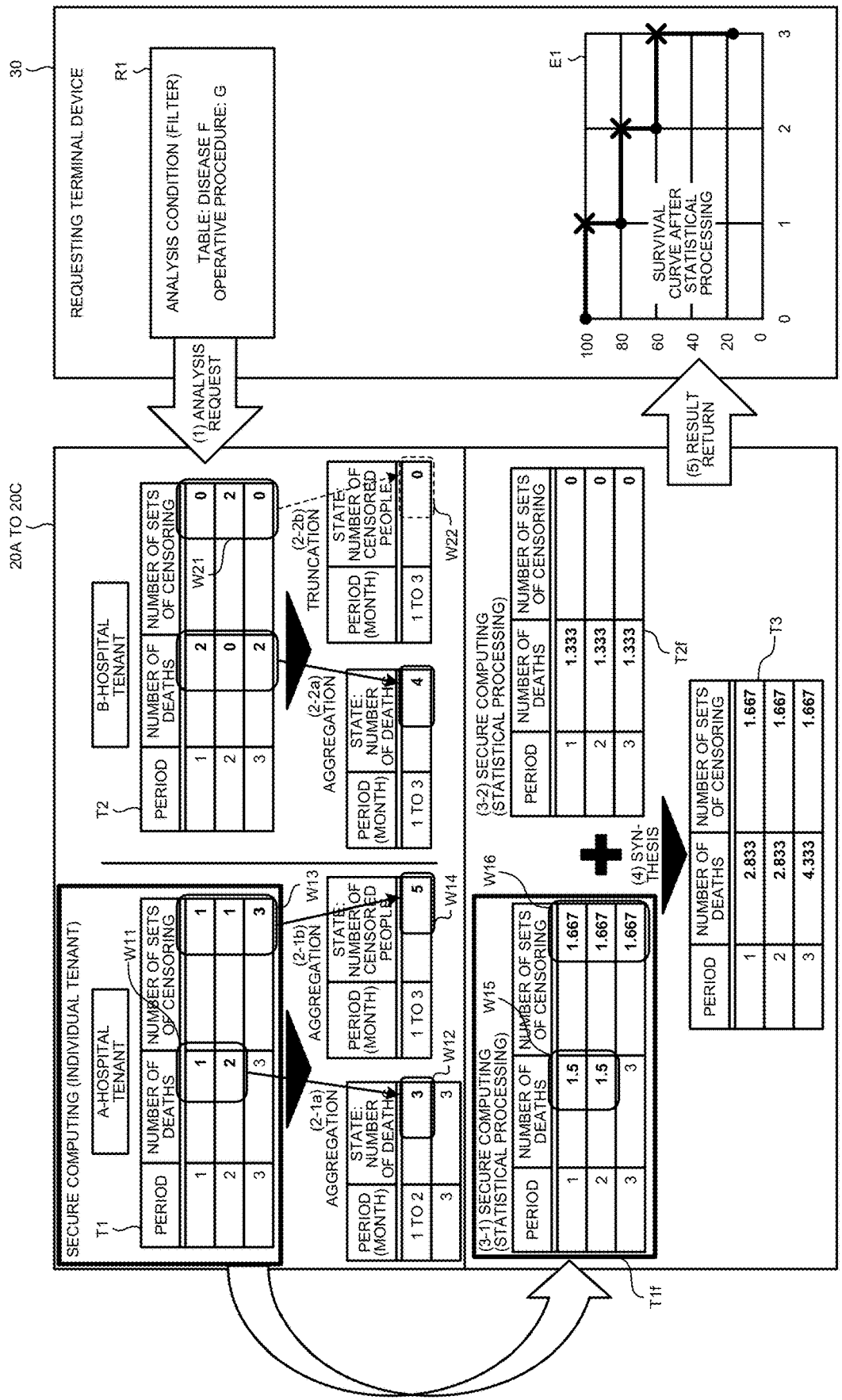
FIG. 7 is a diagram illustrating an example of secure computing on survival rate analysis on a given patient.

A specific example of secure computing in the processing system 100 will be described. FIG. 7 is a diagram illustrating an example of secure computing on survival rate analysis on a given patient.

For example, FIG. 7 illustrates, as an example, the case where the requesting terminal device 30 makes a request for an analysis of a survival rate of a disease-F patient who had an operation by an operative procedure G as an analysis condition R1.

On receiving the request, the servers 20A to 20C acquire data corresponding to the analysis request from the data of the respective tenants. The servers 20A to 20C acquire, as data corresponding to the analysis request, tables T1 and T2 that are data of an A-hospital tenant and a B-hospital tenant and that present the number of deaths of patients and the number of censored patients corresponding to the survival rate analysis request during periods 1 to 3. Note that the servers 20A to 20C acquire data in the state of shares and perform computation and exchange of the data in the state of shares and, in the example in FIG. 7, description will be given using the state of the actual original data to simplify the description.

First of all, in secure computing, the servers 20A to 20C perform statistical processing on the tables T1 and T2. For example, processing of collecting outcomes such that the information that is output from each hospital ensures an aggregate number k=3 or larger in consideration of a risk of identifying an individual is performed as the statistical processing. The servers 20A to 20C perform statistical processing on periods with values each smaller than 3. The servers 20A to 20C aggregate values of successive periods with values each smaller than 3. When the aggregate value is 3 or larger, the servers 20A to 20C convert each value of the area to an average value. When the aggregate value is smaller than 3, the servers 20A to convert each value of the area to 0.

Specifically, the servers 20A to 20C aggregate 1 and 2 (Frame W11) that are numbers of deaths during periods 1 and 2 in the table T1 ((2-1a) in FIG. 7) and sets 3 for the number of deaths during the periods 1 and 2 (Frame W12). The servers 20A to 20C aggregate 1, 1 and 3 (Frame W13) that are numbers of sets of censoring during the periods 1 and 2 in the table T1 and ((2-1b) in FIG. 7) and sets 5 (Frame W14) for the number of censored people during the periods 1 and 3.

The servers 20A to 20C divide the number of people obtained by aggregation by the number of periods of subject, thereby averaging the number as the statistical processing. As for the data of the table T1, the servers to 20C divide 3 that is the number of deaths during the periods 1 and 2 after aggregation by 2 that is the number of periods and sets 1.5 for each of the numbers of deaths during the periods 1 and 2 (Frame W15). The servers 20A to divide 5 that is the number of sets of censoring during the periods 1 to 3 after aggregation by 3 that is the number of the periods and sets 1.667 (Frame W16) for each of the numbers of deaths during the periods 1 to 3. By executing such statistical processing, the table T1 is converted into a table T1*f* on which the statistical processing has been performed ((3-1) in FIG. 7). Note that the process of the statistical processing is executed in secure computing using multi-party computation, too.

As for the numbers of deaths during the periods 1 to 3 in the statistical processing on the table T2, the servers 20A to 20C aggregate the numbers of deaths during the periods 1 to 3 ((2-2a) in FIG. 7), sets 4 for the number of deaths during the periods 1 to 3, and average the number. As for 0, 2 and 0 that are the numbers of sets of censoring during the periods 1 to 3 in the statistical processing on the table T2, because the number of sets of censoring does not reach 3, the servers 20A to 20C perform truncation ((2-2b) in FIG. 7) and sets 0 (Frame W22). Because of such statistical processing, the table T2 is converted into a table T2*f* in which each number of sets of censoring during the periods 1, 2 and 3 is 0 ((3-2) in FIG. 7). In this manner, the servers 20A to 20C perform statistical processing such that it is not possible to estimate the original data.

The servers 20A to 20C subsequently execute the process procedure of the computation process that is set by the requesting terminal device 30. In this case, because the computation process for survival rate analysis on the patient suffering from the disease F who had an operation by the operative procedure G is requested, in order to obtain the number of deaths of corresponding patients and the number of sets of censoring, the servers 20A to 20C synthesize the tables T1*f* and T2*f* after the statistical processing ((4) in FIG. 7) and acquire a table T3 as a computation result. The computation result (for example, a table T3) is a result that is calculated after each set of data is converted into statistical information by which no individual is identified and therefore is in a form by which no individual is identified.

The servers 20A to 20C return the content of the table T3 as the computation result to the requesting terminal device 30 ((5) in FIG. 7). For example, by issuing an instruction for a display of the result on the WebUI screen, the requesting terminal device 30 is able to obtain a survival curve E1, etc., based on the returned computation result. The survival curve E1 is based on the computed result after each set of data is converted into the statistical information by which no individual is identified in the servers 20A to 20C and therefore is in a form by which no individual is identified and it is unnecessary to gain consent for provision to a third party.

Process Procedure

Figure 8:
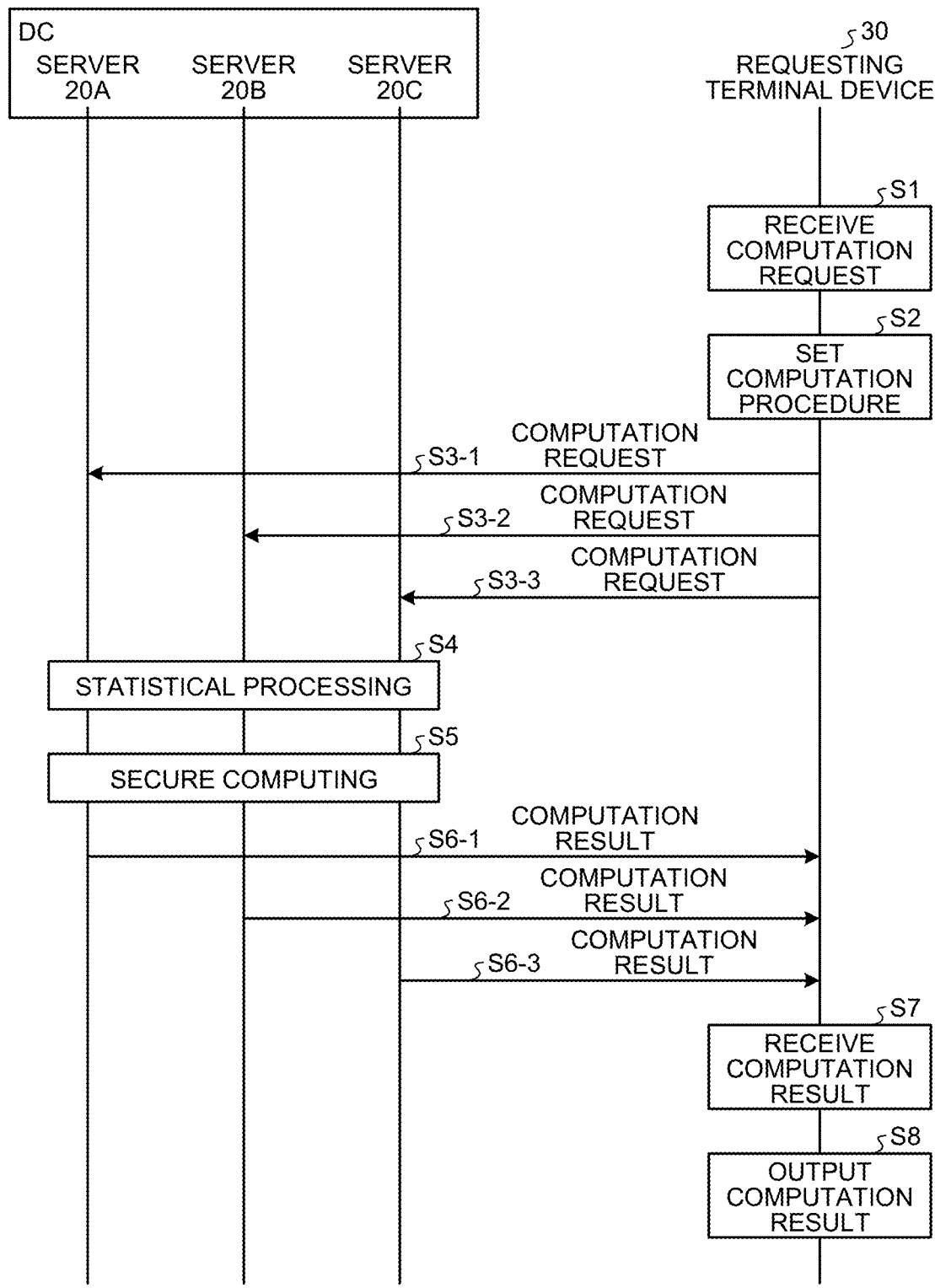
FIG. 8 is a sequence chart illustrating a process procedure of secure computing that the processing system executes.

A process procedure of secure computing in the processing system 100 will be described next. FIG. 8 is a sequence chart illustrating the process procedure of secure computing that the processing system 100 executes.

As illustrated in FIG. 8, on receiving a computation request (step S1), the requesting terminal device 30 sets a process procedure of a computation process corresponding to the request (step S2) and transmits the computation request together with the set process procedure to each of the servers 20A to 20C (steps S3-1 to S3-3).

On receiving the process procedure of the computation process that is set by the requesting terminal device 30, the servers 20A to 20C perform the statistical processing in secure computing on the shares that each of the servers 20A to 20C stores (step S4). Using the statistical information into which conversion is made in the statistical processing, the servers 20A to 20C perform secure computing according to the process procedure that is set by the requesting terminal device 30 (step S5).

Each of the servers 20A to 20C transmits the computation result to the requesting terminal device 30 (steps S6-1 to S6-3). The requesting terminal device 30 receives the computation result being kept coded from each of the servers 20A to 20C (step S7) and, after restoring the results, outputs the computation results (step S8).

Effects of Embodiment

Figure 9:
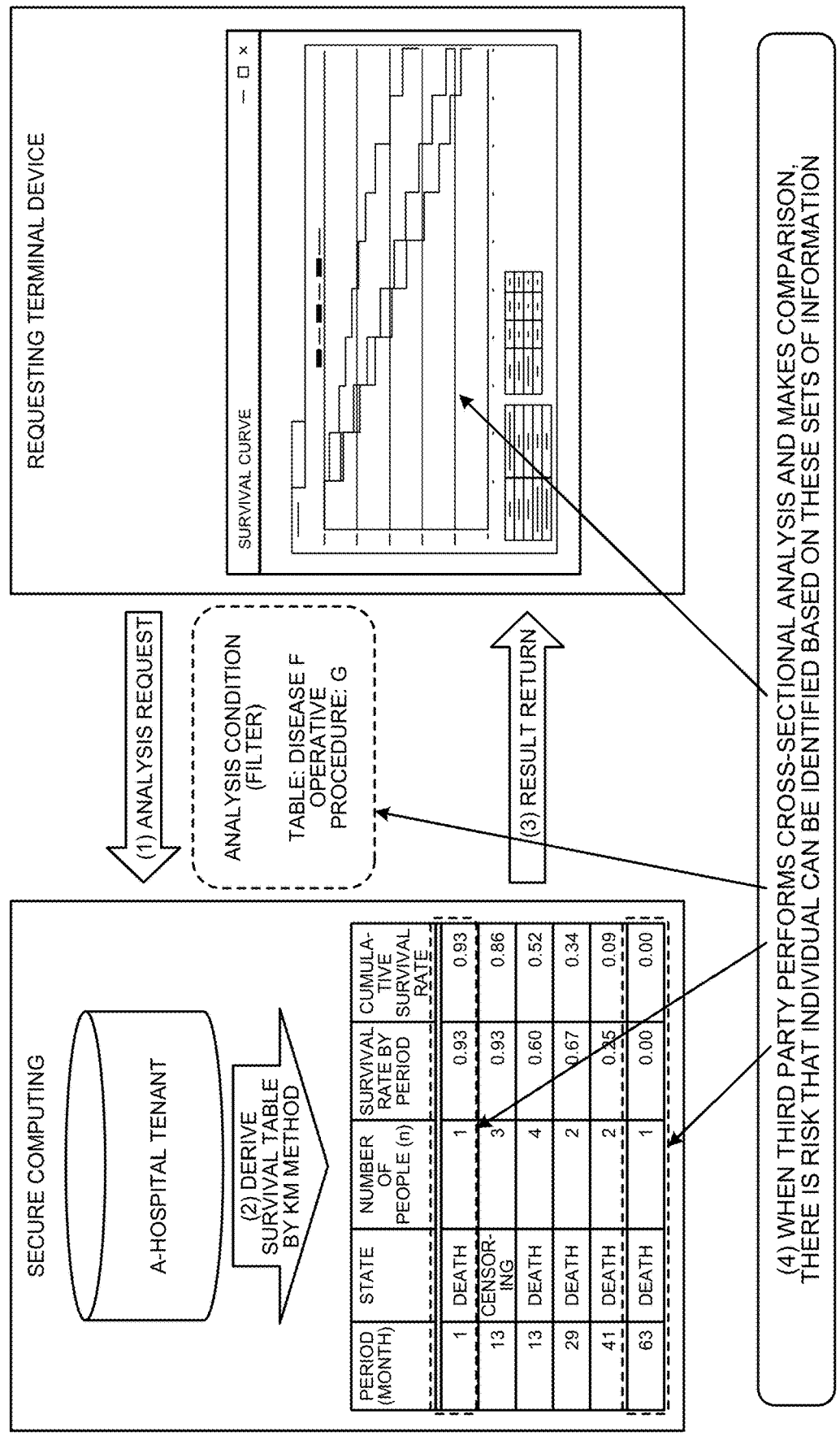
FIG. 9 is a diagram illustrating an example of a process of secure computing.

FIG. 9 is a diagram illustrating an example of a process of secure computing. In normal secure computing, as illustrated in FIG. 9, a plurality of servers perform secure computing of deriving a survival table according to an analysis request and returns the derived survival table as a result ((1) to (3) in FIG. 9). In this case, however, when a third party makes a cross-sectional analysis and a comparison, there is a risk that an individual can be identified based on these sets of information ((4) in FIG. 9). In secure computing, even when shares are dealt with as codes, because a third party is exposed to various types of information containing personal information, provision to a third party occurs. Even secure computing has a risk that, for example, a period in which the value is 1 occurs depending on the analysis condition, which leads to identification of an individual.

Figure 10:
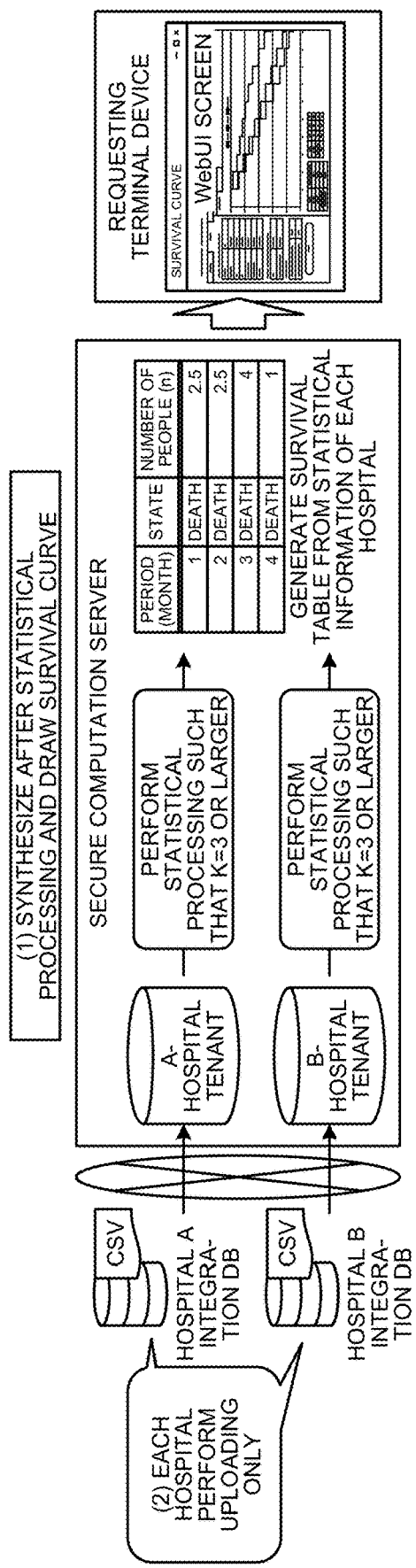
FIG. 10 is a diagram illustrating an example of the process of secure computing in the embodiment.

FIG. 10 is a diagram illustrating an example of the process of secure computing in the embodiment. In the embodiment, after performing the statistical processing on the corresponding data of the A-hospital tenant and the corresponding data of the B-hospital tenant in secure computing, the servers 20A to 20C synthesize the data, generate a survival table ((1) in FIG. 10), and return the survival table to the requesting terminal device.

As described above, in the embodiment, after converting each set of data into statistical information by which no individual is identified in secure computing, each of the servers 20A to 20C performs the computation process that is actually requested. For this reason, in the embodiment, even when the third party makes a cross-sectional analysis using data in secure computing, each of the servers 20A to 20C performs the statistical processing on each set of data before the requested computation process and thus it is possible to return a computation result in a form by which no individual is identified.

Thus, according to the embodiment, it is unnecessary to gain consent for provision of personal information to a third party. In the embodiment, because the servers 20A to 20C perform the statistical processing on data, each registering tenant only need to upload data to be registered and need not undertake, particularly, a process, such as an anonymization process.

System Configuration, Etc.

Each component of each device illustrated in the drawings is a functional idea and need not necessarily be configured physically as illustrated in the drawings. In other words, specific modes of distribution and integration of devices are not limited to those illustrated in the drawings and all or part of the devices can be configured by functional or physical distribution or integration in any unit according to various types of load and usage. Furthermore, all or given part of each processing function implemented by each device can be realized by a CPU or a GPU (Graphics Processing Unit) and a program that is analyzed and executed by the CPU or the GPU or can be realized as hardware according to wired logic.

Among the processes described in the above-described embodiment, all or part of the process that is described as one performed automatically can be performed manually or all or part of the process that is described as one performed manually can be performed automatically by a known method. In addition to this, the process procedure, the control procedure, the specific names, and the information including various types of data and parameters that are presented in the description above and the drawings are changeable freely unless otherwise noted.

Program

It is possible to create a program in which the processes that the registrar servers 10A and 10B, the servers 20A to 20C, and the requesting terminal device 30 described in the above-described embodiment execute are written in a computer-executable language. For example, it is also possible to create a program in which the processes that the registrar servers 10A and 10B, the servers 20A to and the requesting terminal device 30 in the embodiment execute in a computer executable language. In In this case, execution of the program by a computer makes it possible to obtain the same effect as that of the above-described embodiment. Furthermore, the program may be recorded in a computer-readable recording medium and a computer may be caused to read and execute the program that is recorded in the recording medium, thereby realizing the same processes as those of the above-described embodiment.

FIG. 11 is a diagram illustrating a computer that executes a program. As exemplified in FIG. 11, a computer 1000 includes, for example, a memory 1010, a CPU 1020, a hard disk drive interface 1030, a disk drive interface 1040, a serial port interface 1050, a video adapter 1060, and a network interface 1070. Each of these units is connected via a bus 1080.

As exemplified in FIG. 11, the memory 1010 includes a ROM (Read Only Memory) 1011 and a RAM 1012. The ROM 1011 stores, for example, a boot program, such as a BIOS (Basic Input Output System). As exemplified in FIG. 11, the hard disk drive interface 1030 is connected to a hard disk drive 1090. The disk drive interface 1040 is connected to a disk drive 1100. For example, a detachable recording medium, such as, for example, a magnetic disk or an optical disk, is inserted into the disk drive 1100. The serial port interface 1050 is connected to, for example, a mouse 1110 and a keyboard 1120. For example, the video adapter 1060 is connected to, for example, a display 1130.

As exemplified in FIG. 11, the hard disk drive 1090 stores, for example, an OS (Operating System) 1091, an application program 1092, a program module 1093, and program data 1094. In other words, the above-described program is stored in, for example, the hard disk drive 1090 as a program module in which instructions to be executed by the computer 1000 are written.

The various types of data described in the above-described embodiment are stored in, for example, the memory 1010 and the hard disk drive 1090 as program data. The CPU 1020 reads the program module 1093 and the program data 1094 that are stored in the memory 1010 and the hard disk drive 1090 to the RAM 1012 as requested and executes various types of process procedure.

Note that the program module 1093 and the program data 1094 according to the program are not limited to being stored in the hard disk drive 1090, and the program module 1093 and the program data 1094 may be stored in, for example, a detachable storage medium and may be read by the CPU 1020 via the disk drive, or the like. Alternatively, the program module 1093 and the program data 1094 according to the program may be stored in another computer that is connected via a network (such as a LAN (Local Area Network) or a WAN (Wide Area Network)) and may be read by the CPU 1020 via the network interface 1070.

The above-described embodiment and modifications of the embodiment are included in the invention described in CLAIMS and equivalents of the invention as the present application is included in the technique disclosed by the present application.

According to the present invention, when data in secure computing is used, nonnecessity for gaining consent for provision of personal information to a third party is enabled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A processing system that distributes original data in a state of being segmented shares to a plurality of servers, and stores the original data in the servers,
    each of the servers comprising:
        processing circuitry configured to;
            perform statistical processing on the shares that are used in computation that is requested by a requesting device, wherein the statistical processing converts a value by which an individual is identified based on an aggregate value of the value and another value as the statistical processing;
            perform the computation that is requested by the requesting device using statistical information into which conversion is made in the statistical processing; and
            aggregate values of an area with values each smaller than a given value and, when an aggregate value is equal to or larger than the given value, convert each of the values of the area to an average value and, when the aggregate value is smaller than the given value, convert each of the values of the area to 0 as the statistical processing.

2. The processing system according to claim 1, wherein the processing circuitry is further configured to perform statistical processing on the shares in secure computing, and
    perform the computation that is requested by the requesting device in secure computing.

3. A processing method that a processing system that distributes original data in a state of being segmented shares to a plurality of servers, and stores the original data in the servers, the processing method comprising:
    performing statistical processing on the shares that are used in computation that is requested by a requesting device, wherein the statistical processing converts a value by which an individual is identified based on an aggregate value of the value and another value as the statistical processing;
    performing the computation that is requested by the requesting device using statistical information into which conversion is made in the statistical processing; and
    aggregating values of an area with values each smaller than a given value and, when an aggregate value is equal to or larger than the given value, converting each of the values of the area to an average value and, when the aggregate value is smaller than the given value, converting each of the values of the area to 0 as the statistical processing.

4. A non-transitory computer-readable recording medium storing therein a processing program that causes a computer to execute a process comprising:
    distributing original data in a state of being segmented shares to a plurality of servers and storing the original data in the servers,
    performing statistical processing on the shares that are used in computation that is requested by a requesting device, wherein the statistical processing converts a value by which an individual is identified based on an aggregate value of the value and another value as the statistical processing;
    performing the computation that is requested by the requesting device using statistical information into which conversion is made in the statistical processing; and
    aggregating values of an area with values each smaller than a given value and, when an aggregate value is equal to or larger than the given value, converting each of the values of the area to an average value and, when the aggregate value is smaller than the given value, converting each of the values of the area to 0 as the statistical processing.

* * * * *